United States Patent
Un et al.

(10) Patent No.: US 8,862,067 B2
(45) Date of Patent: Oct. 14, 2014

(54) PROXIMATE BEACON IDENTIFICATION

(75) Inventors: Edward Ding-Bong Un, Beijing (CN); Jun Zhao, Beijing (CN); Kai Wang, Beijing (CN); Hailong Mu, Beijing (CN); Zeyong Xu, Beijing (CN); Zhiyang Su, Beijing (CN)

(73) Assignee: Microsoft Corporation, Redmond, WA (US)

( * ) Notice: Subject to any disclaimer, the term of this patent is extended or adjusted under 35 U.S.C. 154(b) by 263 days.

(21) Appl. No.: 13/431,331

(22) Filed: Mar. 27, 2012

(65) Prior Publication Data

US 2013/0260693 A1 Oct. 3, 2013

(51) Int. Cl.
*H04W 24/00* (2009.01)

(52) U.S. Cl.
USPC ................................. 455/67.11; 455/456.1

(58) Field of Classification Search
CPC ............................ H04W 24/00; H04B 17/0042
USPC .................... 455/67.1, 456.1, 67.11
See application file for complete search history.

(56) References Cited

U.S. PATENT DOCUMENTS

| 6,674,403 | B2 | 1/2004 | Gray et al. |
| 7,136,638 | B2 * | 11/2006 | Wacker et al. ................. 455/424 |
| 7,146,134 | B2 * | 12/2006 | Moon et al. ................. 455/67.11 |
| 7,212,821 | B2 * | 5/2007 | Laroia et al. ................. 455/437 |
| 7,307,820 | B2 * | 12/2007 | Henson et al. ................. 361/42 |
| 7,312,752 | B2 * | 12/2007 | Smith et al. ................. 342/464 |
| 7,324,545 | B2 * | 1/2008 | Chuah et al. ................. 370/449 |
| 7,349,702 | B2 * | 3/2008 | Graumann ................. 455/450 |
| 7,489,661 | B2 * | 2/2009 | Hills et al. ................. 370/332 |
| 7,590,720 | B2 | 9/2009 | Bahl |
| 7,751,829 | B2 * | 7/2010 | Masuoka et al. ........... 455/456.1 |
| 7,769,396 | B2 * | 8/2010 | Alizadeh-Shabdiz et al. ......................... 455/456.6 |
| 7,818,017 | B2 * | 10/2010 | Alizadeh-Shabdiz et al. ......................... 455/456.6 |
| 7,822,564 | B2 * | 10/2010 | Davis et al. ..................... 702/60 |
| 8,031,120 | B2 * | 10/2011 | Smith et al. .................. 342/451 |
| 8,060,018 | B2 * | 11/2011 | Davis et al. .................. 455/41.3 |
| 8,077,090 | B1 * | 12/2011 | Chintalapudi et al. ........ 342/451 |
| 8,095,139 | B2 * | 1/2012 | Marinier ...................... 455/446 |

(Continued)

OTHER PUBLICATIONS

Yan, et al., "In-Store Shopping Activity Modeling Based on Dynamic Bayesian Networks", Retrieved at <<http://www.indiana.edu/~wits2009/Session2b.pdf>>, Proceedings of 19th Workshop on Information Technologies and Systems, Dec. 14, 2009, pp. 55-60.

(Continued)

*Primary Examiner* — Hai V Nguyen
(74) *Attorney, Agent, or Firm* — Dave Ream; Jim Ross; Micky Minhas

(57) ABSTRACT

Among other things, one or more techniques and/or systems are disclosed for identifying a proximate beacon to a mobile device. One or more first received signal strengths (RSSs), relative to the mobile device, may be received and used to determine a first average signal strength (RSS) and a first average RSS deviation for a first beacon during an observation period. An average RSS deviation for the observation period can be determined using the first average RSS deviation (e.g., and other average RSS deviations). If the average RSS deviation meets a desired deviation threshold, the first beacon may be identified as the proximate beacon. In this manner, if the user of the mobile device consents to the same, the user may be provided with relevant information (e.g., advertisements) on the mobile device while in a locale (e.g., store) corresponding to the (known) location of the beacon, for example.

20 Claims, 9 Drawing Sheets

(56) References Cited

U.S. PATENT DOCUMENTS

| | | | |
|---|---|---|---|
| 8,554,226 B2* | 10/2013 | Laroia et al. | 455/437 |
| 8,559,975 B2* | 10/2013 | Lin et al. | 455/456.1 |
| 8,626,073 B2* | 1/2014 | Ruuska | 455/67.11 |
| 2004/0198234 A1* | 10/2004 | Wacker et al. | 455/67.13 |
| 2005/0070279 A1* | 3/2005 | Ginzburg et al. | 455/434 |
| 2005/0124344 A1* | 6/2005 | Laroia et al. | 455/436 |
| 2005/0136845 A1* | 6/2005 | Masuoka et al. | 455/67.14 |
| 2005/0286440 A1* | 12/2005 | Strutt et al. | 370/253 |
| 2007/0060067 A1* | 3/2007 | Ruuska | 455/67.11 |
| 2008/0068981 A1* | 3/2008 | Marinier | 370/208 |
| 2008/0139217 A1* | 6/2008 | Alizadeh-Shabdiz et al. | 455/456.1 |
| 2008/0200181 A1 | 8/2008 | Zill et al. | |
| 2008/0227463 A1* | 9/2008 | Hizume et al. | 455/456.1 |
| 2008/0252527 A1* | 10/2008 | Garcia | 342/450 |
| 2009/0028120 A1* | 1/2009 | Lee | 370/338 |
| 2009/0093956 A1* | 4/2009 | Wu et al. | 701/213 |
| 2009/0286548 A1* | 11/2009 | Coronel et al. | 455/456.1 |
| 2010/0073235 A1* | 3/2010 | Smith et al. | 342/451 |
| 2010/0097982 A1* | 4/2010 | Eichenberger et al. | 370/328 |
| 2011/0182238 A1 | 7/2011 | Marshall et al. | |
| 2011/0304503 A1* | 12/2011 | Chintalapudi et al. | 342/357.29 |
| 2011/0306375 A1* | 12/2011 | Chandra et al. | 455/509 |
| 2011/0320539 A1 | 12/2011 | Zhao et al. | |
| 2012/0081250 A1* | 4/2012 | Farrokhi et al. | 342/357.31 |
| 2012/0110635 A1* | 5/2012 | Harvey et al. | 726/1 |
| 2012/0122475 A1* | 5/2012 | Ahmed et al. | 455/456.1 |
| 2012/0135777 A1* | 5/2012 | Karpoor et al. | 455/522 |
| 2012/0139790 A1* | 6/2012 | Wirola et al. | 342/385 |
| 2012/0196621 A1* | 8/2012 | Alizadeh-Shabdiz et al. | 455/456.1 |
| 2012/0220310 A1* | 8/2012 | Gogic et al. | 455/456.1 |
| 2013/0023282 A1* | 1/2013 | Lin et al. | 455/456.1 |
| 2013/0217332 A1* | 8/2013 | Altman et al. | 455/41.2 |
| 2013/0252631 A1* | 9/2013 | Alizadeh-Shabdiz et al. | 455/456.1 |
| 2013/0336138 A1* | 12/2013 | Venkatraman et al. | 370/252 |
| 2014/0011518 A1* | 1/2014 | Valaee et al. | 455/456.1 |
| 2014/0111380 A1* | 4/2014 | Gibbs et al. | 342/451 |

OTHER PUBLICATIONS

Barsocchi, et al., "A Novel Approach to Indoor RSSI Localization by Automatic Calibration of the Wireless Propagation Model", Retrieved at <<http://ieeexplore.ieee.org/stamp/stamp.jsp?tp=&arnumber=5073315>>, Proceedings of 69th Vehicular Technology Conference, Apr. 26, 2009, pp. 1-5.

Krumm, et al., "LOCADIO: Inferring Motion and Location from Wi-Fi Signal Strengths", Retrieved at <<http://research.microsoft.com/en-us/um/people/horvitz/locadio.pdf>>, Proceedings of First Annual International Conference on Mobile and Ubiquitous Systems: Networking and Services, Aug. 22, 2004, pp. 10.

* cited by examiner

PROXIMATE BEACON IDENTIFICATION

BACKGROUND

Computing devices have become more portable and mobile devices have become more interactive with a user's surroundings. For example, a mapping application running on the user's mobile device (e.g., smartphone) may allow the user to identify their approximate location on a map displayed on the mobile device. Further, points of interest, retails establishments, entertainment venues, and more, can be indicated on such a map, for example, which can be searched for, and/or identified as the user moves through an area. Typically, mobile devices use global positioning systems (GPS), which utilize satellite triangulation, or some sort of signal triangulation (e.g., mobile phone signal) to identify the approximate location of the user. This location information can be used by various applications on the user's device, such as to provide appropriate and relevant local information, identify the user's location for social networking, and more.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Current global positioning systems (GPS) and/or other location identification services used on mobile devices may not provide needed fidelity for some user-experiences, such as applications running on the mobile device, and/or information provided to mobile device data providers. For example, the GPS systems can have an error range of thirty to fifty feet, which may not provide needed fidelity when the user-experience needs the user to be immediately (or at least substantially) proximate to a specific location.

Further, while the GPS and mobile signal triangulation can provide an approximate position of the user relative to a mapped point, a distance from the user to a particular object may not meet granularity requirements to properly interact, such as identifying a location from several overlapping locations. Additionally, GPS-type location tracking loses reliability when a mobile device is inside a building or under cover (e.g., parking garage). Even in optimal conditions, a GPS may not be able tell that the user is inside a particular building, standing in front of a particular display in a store, etc.

Accordingly, among other things, one or more techniques and/or systems are provided that utilize a signal transmissions from one or more local beacons to identify a potential location of a mobile device (e.g., and thus an associated user using the mobile device). For example, the mobile device may detect signals (e.g., wireless signals) from one or more beacons, respectively positioned in different locations (e.g., stores, throughout a building, etc.) of a larger area. The received signals can be analyzed and filtered to identify a set of signals from a proximate beacon (e.g., closest to the mobile device). Further, if the user is non-stationary (e.g., moving through a shopping center), a non-stationary condition can be detected, and a proximate beacon may not be identified (e.g., as the user may be proximate to several beacons while moving). The location awareness provided herein can help determine a potential location of the mobile device/user relative to a known location (e.g., the proximate beacon may be known to be installed in a particular store). In this way, rich content (e.g., relative to the user's location) can be provided to the user (e.g., on-the-fly, on the mobile device).

In one embodiment of identifying a proximate beacon to a mobile device, a first average received signal strength (RSS) can be determined for a first beacon; and a first average RSS deviation can be determined for the first beacon. The determinations may be based at least upon a received first RSS, that is relative to a mobile device, over a desired observation period. Further, an average RSS deviation can be determined for the desired observation period, using at least the first average RSS deviation. If the average RSS deviation meets a desired deviation threshold, the first beacon can be identified as a proximate beacon, using the first average RSS.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1:
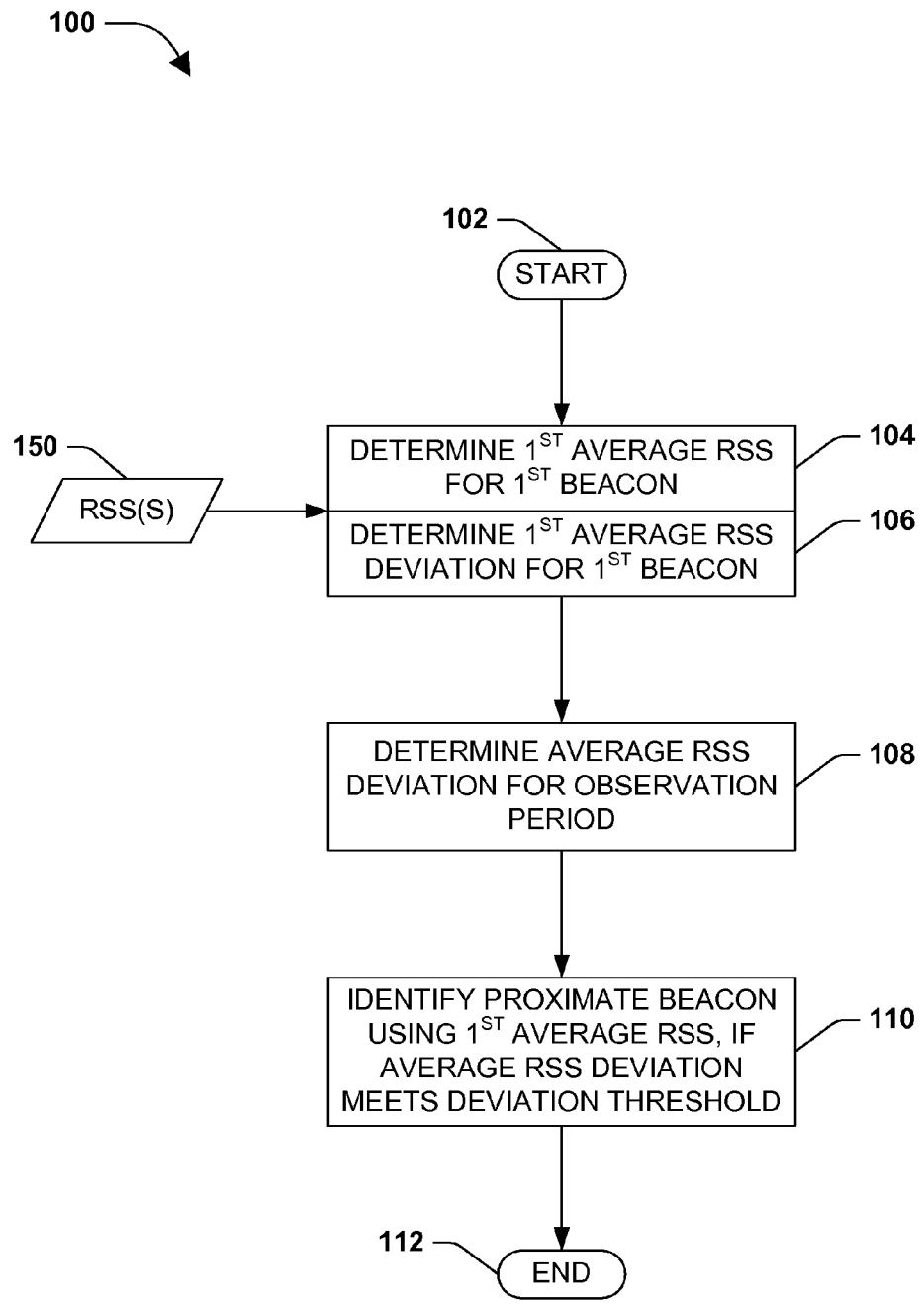
FIG. 1 is a flow diagram illustrating an exemplary method for identifying a proximate beacon to a mobile device.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

As provided herein, a method may be devised that can provide for identifying a location of a mobile device (e.g., and the user of the mobile device) in proximity to a beacon device. That is, for example, one or more beacons may be respectively located in portions (e.g., stores) of an area (e.g., a mall).

In this example, the respective beacons can output a wireless signal that can be detected by the mobile device, when the mobile device is within a certain proximity of respective beacons. The mobile device may detect one or more signals from one or more beacons over an observation period, and a beacon closest to the mobile device, for example, may be identified based on an average signal strength detected over the observation period. In this way, for example, the portion of the area (e.g., a particular store in the mall) in which the user is located may also be identified.

FIG. 1 is a flow diagram illustrating an exemplary method 100 for identifying a proximate beacon to a mobile device. The exemplary method 100 begins at 102. At 104, a first average received signal strength (RSS) for a first beacon is determined, based at least upon a first RSS 150 relative to the mobile device over a first observation period. At 106, a first average RSS deviation is determined for the first beacon, based at least upon the first RSS 150 relative to the mobile device over the first observation period.

As one example, the beacon may be a device that periodically (e.g., or continuously) transmits a signal, such as short-distance wireless (e.g., Bluetooth low energy), medium distance wireless (e.g., Wi-Fi), and/or other electric, magnetic and/or electro-magnetic, etc. transmissions. In this example, a mobile device may be configured to detect the transmitted signals from the beacon, such that when the mobile device is located within a transmission range, the signal may be detected. Further, for example, the mobile device may be able to identify a receive signal strength (e.g., a received signal strength indicator (RSSI)) for the detected signal, which may be used to determine an approximate distance between the mobile device and the beacon.

One or more first RSSs 150 from, over, during, etc. the observation period can be used to determine the first average RSS for the first beacon, for example, comprising an average signal strength for transmitted signals received by the mobile device during the observation period. Further, in this example, the one or more first RSSs 150 from the observation period can be combined with the first average RSS to determine the first average RSS deviation for the first beacon, for example, comprising a statistical dispersion or variability of the respective one or more first RSSs (e.g., how much the strength of the signals detected by the mobile device varies).

At 108 in the exemplary method 100, an average RSS deviation can be determined for the desired observation period, based at least upon the first average RSS deviation. As one example, the first average RSS deviation may be combined with one or more second average RSS deviations (if available) to determine the average RSS deviation for the period (e.g., period average RSS deviation).

For example, signals transmitted by a second beacon (e.g., and a third, fourth, etc.) may be detected by the mobile device, and the respective RSSs can be averaged (e.g., a second RSS average). In this example, the RSS averages for the second beacon (e.g., second RSS averages) may be used to identify a second average RSS deviation, which can be combined with the first average RSS deviation to identify the period average RSS deviation (e.g., the average RSS deviation for all beacons during the observation period).

At 110 in the exemplary method 100, if the average RSS deviation meets a desired deviation threshold, the first beacon is identified as a proximate beacon based at least upon the first average RSS. As one example, a greater average RSS deviation may indicate that the mobile device (e.g., detecting the respective beacon RSSs) was non-stationary during the observation period. That is, for example, a beacon signal strength detected by the mobile device may vary widely between respective signal detections when the mobile device is moving. In one embodiment, the desired deviation threshold may be determined using empirical data, and may be adjusted based on updated observed data related to stationary and/or non-stationary mobile device signal detection. For example, the desired deviation threshold may indicate a threshold level of mobile device movement (e.g., within a specified area) during an observation period for detecting a proximate beacon.

As one example, if the period average RSS deviation meets the desired deviation threshold, the beacon having a "strong" average RSS may be selected as the proximate beacon. For example, a higher, greater, etc. average RSS may indicate that the beacon is closer than a beacon with a lower, lesser, etc. average RSS. For example, if there is merely one beacon, such as the first beacon, the first average RSS may comprises the highest value. Therefore, in this example, the first beacon can be selected as the proximate beacon (e.g., closest). As another example, if there is more than one beacon, the beacon comprising the "highest" average RSS value may be selected as the proximate (e.g., closest) beacon to the mobile device.

Having selected the proximate beacon, the exemplary method 100 ends at 112.

Figure 2:
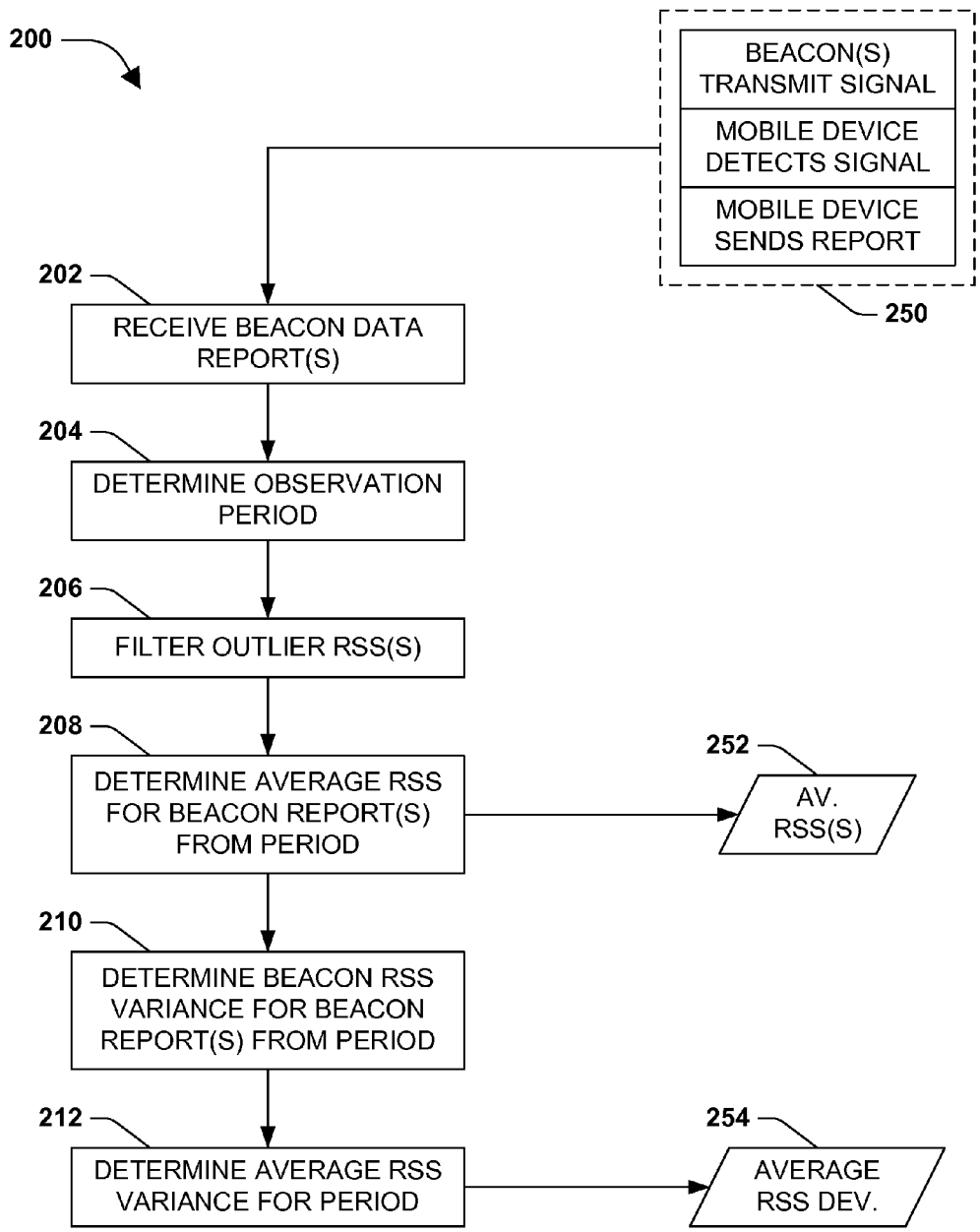
FIG. 2 is a flow diagram illustrating an example embodiment where one or more portions of one or more techniques described herein may be implemented.

FIG. 2 is a flow diagram illustrating an example embodiment 200 where one or more portions of one or more techniques described herein may be implemented. At 202, one or more beacon data reports may be received. As one example, a plurality of signal transmitting beacon devices may be dispersed in an area. Further, in this example, a location of the respective beacons may be associated with a beacon identifier (e.g., merely linked to one beacon). That is, for example, a database may comprise data comprising a location of a beacon linked with data comprising a beacon ID for that beacon. Additionally, in this example, the respective beacons may transmit a signal indicative of at least their beacon ID.

In one embodiment, at 250, the one or more beacons may transmit a signal, comprising an indication of a corresponding beacon ID. If the mobile device is located within a signal range of one or more of the one or more beacons the mobile device may detect the signal(s). In one embodiment, the mobile device may be able to identify a strength of a detected signal. As one example, when a mobile phone, a Wi-Fi enabled device, and/or low energy (e.g., Bluetooth) enabled device receives a compatible phone signal, Wi-Fi signal and/or low energy signal, the device may detect the signal strength and, for example, provide a RSS indicator to the user (e.g., number and/or height of signal bars). The mobile device can create a beacon data report for the detected signal, for example, comprising the RSS and the beacon ID corresponding to the RSS (e.g., and send out the beacon data report, such as to a remote service).

Figure 4:
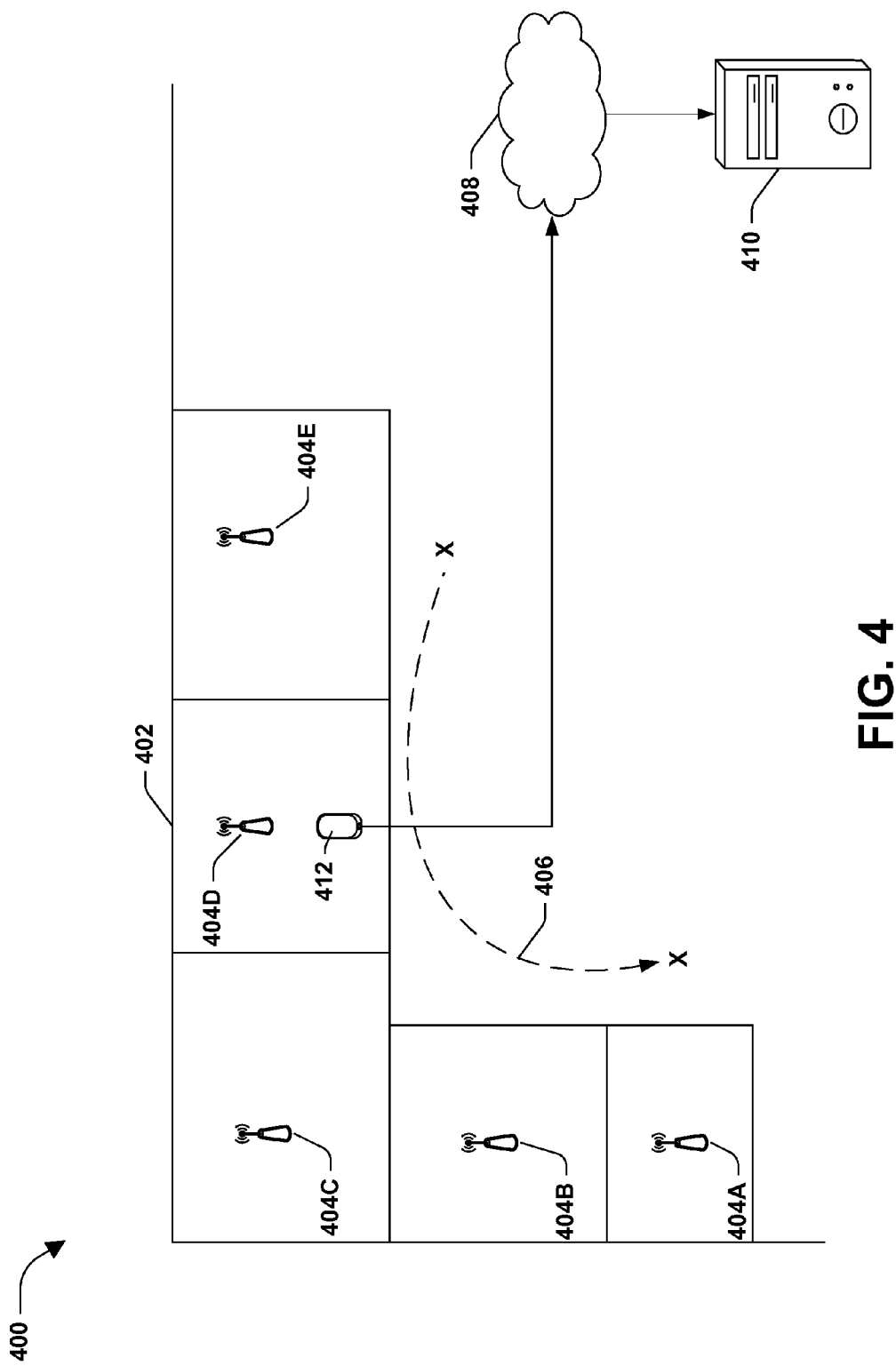
FIG. 4 illustrates and example embodiment where one or more portions of one or more techniques described herein may be implemented.

As an illustrative example, FIG. 4 illustrates and example embodiment 400 where one or more portions of one or more techniques described herein may be implemented. In this example 400, a shopping center 402 may comprise a plurality of shops, respectively comprising a beacon 404(A-E). In this example, when a user with a mobile device 412 (e.g., configured to detect beacon signals) enters a shop in the center 402, the mobile device 412 may detect a signal from a beacon 404D located in the shop. Further, in this example, the mobile device 412 may detect one or more signals from other beacons 404A-C, 404E located in nearby shops (e.g., depending on the signal range, etc.). In this example, the mobile device 412 may prepare one or more beacon data reports, respectively corresponding to signals received from a beacon in a shop, and the one or more reports may be sent, such as over a network 408 to a remote locator service 410 (e.g., a cloud-based service providing mobile device location services).

Returning to FIG. 2, at 204, a desired observation period can be determined. In one embodiment, the desired observation period may comprise a period of time during which a desired number of beacon data reports are received. As one example, the desired number of beacon data reports may comprise a number that provides a statistically significant result when identifying the proximate beacon (e.g., one that is unlikely to have occurred by mere chance). The desired observation period may depend on one or more factors, such as a signal transmission frequency (e.g., period between transmissions, not radio frequency), report receiving frequency, beacon signal strength, empirical data for RSS deviation, and others, for example.

As one example, the desired observation period may be long enough to receive a statistically significant number of reports, but not too long as to allow for higher RSS deviation if/when the mobile device user moves. As an illustrative example, in FIG. 4, a stationary mobile device 412 will typically receive a series of beacon signals (e.g., from one or more beacons 404) that have a small RSS deviation, as a distance between the device 412 and respective beacons 404 remains relatively constant, and a signal transmission strength from the beacons 404 also remains relatively constant. However, the RSS deviation for a non-stationary mobile device 406 (e.g., where the user may be moving from shop to shop) may be larger, as the distance between the non-stationary mobile device 406 and the respective beacons 404 may change as the user moves.

Therefore, for example, typical user movements may be identified (e.g., empirically) and used to determine the desired observation period, and/or used to update the desired observation period. As one example, a user may remain relatively stationary for an average of four seconds within a store. In this example, respective beacon signal transmission frequencies (e.g., period between transmissions) may be calibrated to transmit enough signals within the four seconds to provide a statistically significant number of beacon data reports.

In another embodiment, the desired observation period may be determined by the number of beacon data reports received (e.g., for one or more of the beacons). As one example, a first average RSS for the first beacon may not be determined, at least, until a desired number of first beacon data reports are received for the first beacon, thereby determining a length of the desired observation period. For example, the desired observation period may comprise a period of time that remains open until a statistically significant (e.g., adequate) number of beacon data reports are received.

Returning to FIG. 2, at 206, RSS outliers may be filtered out. In one embodiment, an outlier RSS may be identified in one or more of the received beacon data reports, and, if identified, the outlier RSS may not be used in determining an average RSS for the beacon associated with the outlier RSS (e.g., the first average RSS for the first beacon). As one example, some building, mechanical, electrical and other components/devices may impart a type of interference (e.g., electrical noise) on a beacon signal transmission sent by the beacon and/or received by the mobile device, and/or an RSS for a signal from a beacon may vary over time (e.g., even when the device is not moving), such as from an object moving between the sending beacon and receiving device and/or from random noise or variations in electronic circuitry in transmitter and/or receiver components, for example. A "false" signal may, for example, be received by the mobile device, where the false signal may not comprise an appropriate representation of a RSS for the beacon (e.g., a corrupted signal), and/or may comprise a signal that is not from the beacon (e.g., transmitted by another electrical component).

Signal noise and/or a false signal may result in a sharp increase or decrease in a RSS for a beacon, for example, which may be identified when compared with one or more prior or subsequent RSSs received for the beacon. As one example, identifying the outlier RSS may comprise computing a RSS difference between a first and second RSS for a beacon, and comparing the RSS difference to a difference threshold that is indicative of an outlier RSS. For example, if the second RSS comprises a fifty percent jump from the first RSS, received at a one second interval, the second RSS may comprise an outlier RSS, as the mobile device is not likely to be able to move close enough to the beacon within one second to produce the fifty percent increase in RSS.

Figure 5:
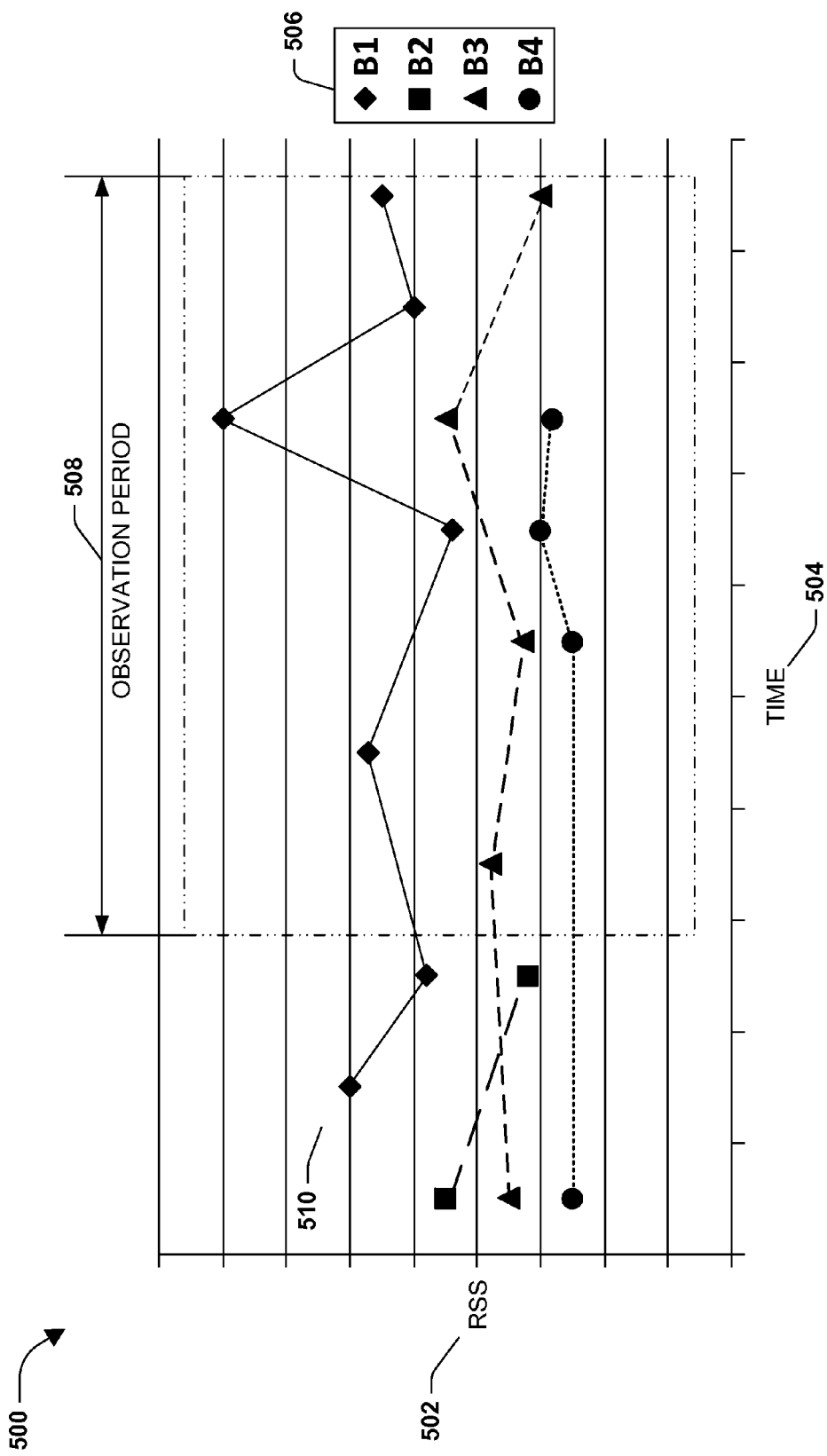
FIG. 5 is a graph illustrating an example embodiment of data in received beacon data reports.

At 208 in the example embodiment 200, an average RSS 252 can be determined for one or more beacon data reports received for respective one or more beacons during the desired observation period. As an illustrative example, FIG. 5 is a graph illustrating an example embodiment 500 of data in received beacon data reports. In this example embodiment 500, RSS is indicated by the Y axis 502, and time is indicated by the X axis 504. An observation period 508 comprises a period time during which beacon RSSs 510 may be used when determining an average RSS for the respective beacons 506, B1, B2, B3 and B4.

In this example 500, a first and second RSS for beacon B2 do not fall within the observation period 508, therefore beacon B2 may not be included in determination of the proximate beacon. Further, a first and second RSS for beacon B1, a first RSS for beacon B3, and a first RSS for beacon B4 also fall outside the observation period 508, and these respective RSSs may not be included when determining the average RSS for the respective beacons B1, B3 and B4.

In one embodiment, an average RSS (e.g., for respective beacons B1, B3 and B4 of FIG. 5) can be determined by summing respective RSS values for the beacon during the observation period (e.g., 508 of FIG. 5), and dividing the sum by a number of RSS values identified during the observation period. As an illustrative example, in FIG. 5, for beacon B1, the RSS values identified in the observation period may comprise (e.g., in decibels per milliwatt (dBmW)) negative forty-two (−42), negative fifty-six (−56), negative twenty (−20), negative fifty (−50), and negative forty-five (−45) respectively. In this example, the sum of these RSS values comprises negative two hundred and thirteen (e.g., (−42)+(−56)+(−20)+(−50)+(−45)=−213). Therefore an average RSS for beacon B1 can comprise negative forty-two point six (dividing negative two-hundred and thirteen by five (five RSS values) (e.g., −213/5=−42.6). In this embodiment, an average RSS value may also be determined for the beacons B3 and B4. It may be appreciated that in one example, the RSS value for beacon B1 of negative twenty may be omitted as an outlier and thus not included in the calculation of the average RSS for beacon B1 (e.g., because the value of negative twenty is too different from the other RSS values for beacon B1 (e.g., influenced by noise, etc.)).

In one aspect, a first beacon may comprise a first signal transmission strength, and a second beacon may comprise a second signal transmission strength. As one example, the mobile device may receive the first and second signals, where the first signal RSS is higher than the second signal RSS, even though the second beacon may be located closer to the mobile device. For example, if the second (closer) beacon transmits at a lower power, the resulting RSS may not be indicative of the distance between the mobile device and second beacon when compared with the first beacon (e.g., and/or other beacons) that have a higher transmission power (than the second beacon).

In one embodiment, in this aspect, the average RSS for a beacon may be normalized to account for signal transmission power. As one example, the beacon data report for the first (and/or second) beacon may further comprise a first (and/or second) transmission power value. A beacon's transmission power value may also be received from the beacon, for example, such as in a signal received from the beacon (e.g., alternative to and/or in addition to a beacon data report for the beacon). The first (and/or second) transmission power value may be used, for example, to normalize the average RSS for the first (and/or second) beacon, when compared with average RSSs of other beacons.

In one embodiment, the transmission power value comprised in the beacon data report may be used to determine a signal attenuation for the beacon. As one example, the first transmission power value and the first RSS may be used to determine a first signal attenuation for the first beacon (e.g., the first transmission power value may be subtracted from the first RSS to determine the first signal attenuation for the first beacon). Further, in this example, the first average RSS may comprise an average of first signal attenuations for the first beacon during the observation period. In this way, for example, the transmission power value can be accounted for in average RSSs for the respective beacons.

Returning to FIG. 2, at 210, a beacon RSS deviation can be determined for the respective beacons for which the average RSS has been identified (e.g., those identified during the observation period). As one example, the beacon RSS deviation may be determined by determining a statistical sample variance, such as absolute deviation or standard deviation (e.g., root mean square deviation). For example, As an illustrative example, in FIG. 5, an absolute deviation for beacon B1 may comprise:

$$\tfrac{1}{5}(|(-42)-(-42.6)|+|(-56)-(-42.6)|+|(-20)-(-42.6)|+ |(-50)-(-42.6)|+|(-45)-(-42.6)|)=9.3$$

Further, in this example, a standard deviation for beacon B1 may comprise:

$$\sqrt{\tfrac{1}{5}(|(-42)-(-42.6)|^2+|(-56)-(-42.6)|^2+|(-20)-(-42.6)|^2+|(-50)-(-42.6)|^2+|(-45)-(-42.6)|^2)} \approx 12.3$$

In this embodiment, a beacon RSS deviation value may also be determined for the beacons B3 and B4.

Returning to FIG. 2, at 212, an average RSS deviation 254 can be determined for the desired observation period. As one example, respective beacon RSS deviation values determined for the beacons during the observation period may be used to determine the average RSS deviation 254 for the desired observation period. As an illustrative example, in FIG. 5, the standard deviation value for beacon B1 (e.g., 118) may be combined with the respective standard deviations for beacons B3 and B4 (e.g., sum the standard deviation values from respective beacons and divide by three (three standard deviation values used) to determine the average RSS deviation for the observation period 508.

Figure 3:
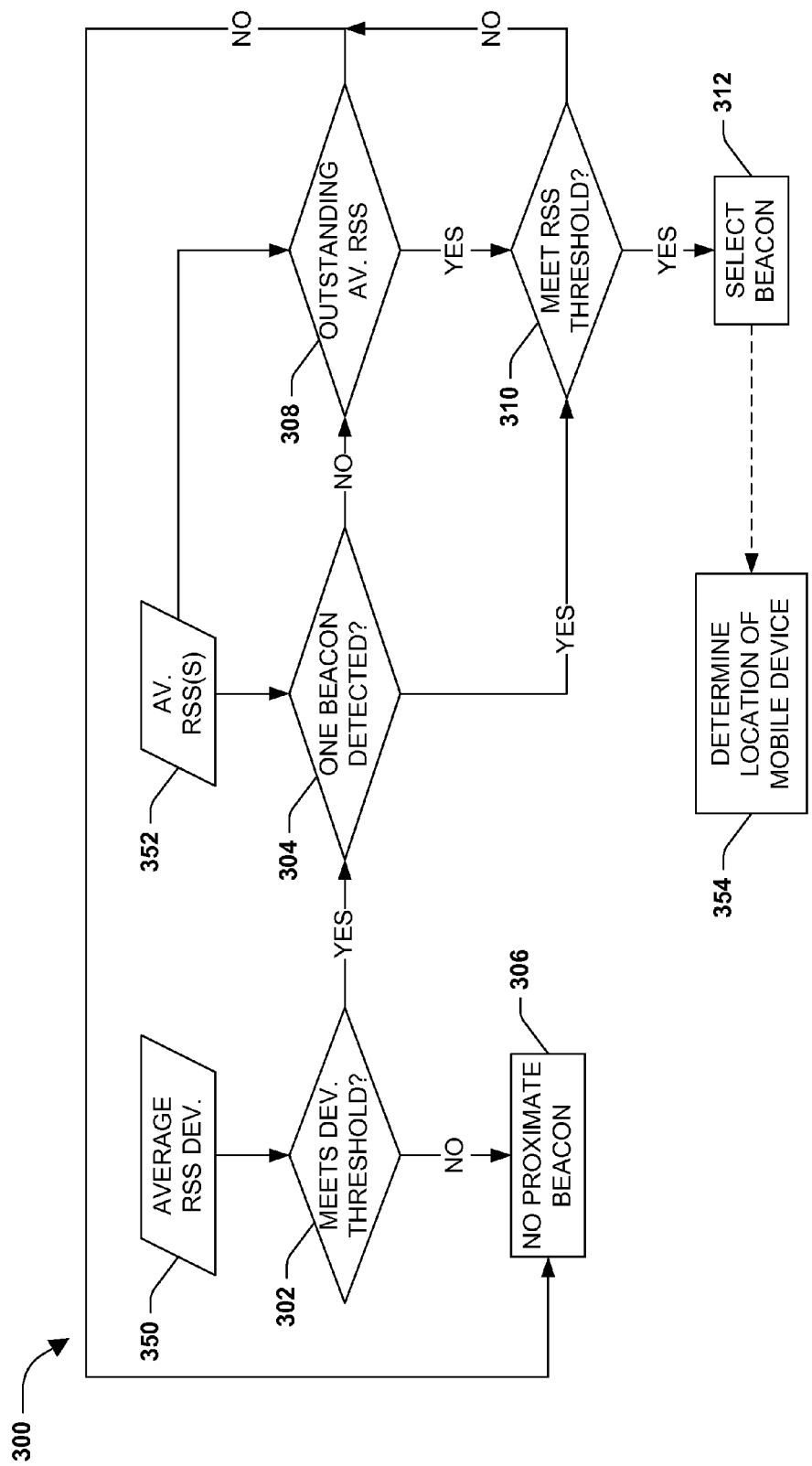
FIG. 3 is a flow diagram illustrating an example embodiment where one or more portions of one or more techniques described herein may be implemented.

FIG. 3 is a flow diagram illustrating an example embodiment 300 where one or more portions of one or more techniques described herein may be implemented. At 302, an average RSS deviation for an observation period 350 (e.g., 254 of FIG. 2) may be compared with a desired deviation threshold. As described above, for example, a greater average RSS deviation for the observation period may indicate that the mobile device was non-stationary during the observation period. Further, as described above, empirical data may be used to determine a desired deviation threshold, which can be adjusted based on updated observed data related to stationary and/or non-stationary mobile device signal detection, for example.

If the average RSS deviation for the observation period 350 does not meet the desired deviation threshold (e.g., is higher than the threshold) (NO at 302), no proximate beacon may be identified for the mobile device, at 306. That is, for example, an average RSS deviation that is greater than the deviation threshold may indicate that the mobile device was non-stationary during the observation period (e.g., the user was moving from shop to shop 406 of FIG. 4), thereby indicating that the mobile device may not have been proximate to any one beacon during the observation period.

If the average RSS deviation for the observation period 350 meets the desired deviation threshold (e.g., is equal to or lower than the threshold) (YES at 302), a number of beacons for which RSS data was received can be identified, at 304, for example, by identifying how may average RSSs 352 (e.g., 252 of FIG. 2) were identified. If more than one beacon is identified (e.g., by identifying how may average RSS 352 were determined) (NO at 304) the respective average RSSs can be compared to determine if an "outstanding" average RSS is indicated, at 308. As one example, an "outstanding" average RSS may comprise a highest average RSS. For example, a highest average RSS value may indicate a closest beacon if respective detected beacons comprise a similar signal transmission strength (e.g., the beacons transmit their signals, detected by the mobile device, at relatively the same strength).

If no outstanding average RSSs are identified (NO at 308) no proximate beacon may be identified (e.g., a proximate beacon is not able to be determined), at 306. As one example, a first average RSS value may be similar (e.g., within a desired RSS range) as a second average RSS value (e.g., and/or similar to a third, fourth, etc.). In this example, where no one RSS value stands out from the set of average RSS values 352 for the observation period, the mobile device may be proximate to more than one beacon (e.g., within a similar distance).

If an outstanding average RSSs is identified (YES at 308) the outstanding average RSS can be compared to a desired RSS threshold, at 310. In one embodiment, the desired RSS threshold can comprise an RSS value, for example, where the RSS threshold value may comprise a desired signal strength that indicates a desired distance from a beacon. For example, if the outstanding average RSS is below the desired RSS threshold (e.g., indicating a weak signal), the mobile device may have been located outside an area covered by the beacon associated with the outstanding average RSS (e.g., outside the shop comprising the beacon).

Further, at 304, if merely one average RSS is detected, from one beacon, (YES at 304) the average RSS for the one beacon can be compared to the desired RSS threshold, at 310. As one example, a value of the one average RSS detected may be compared to the threshold RSS value to determine whether the mobile device may have been located outside the area covered by the beacon associated with the one average RSS.

In one embodiment, the desired RSS threshold may comprise an RSS value difference between a first average RSS for a first beacon and a second average RSS for a second/different beacon. As one example, the first average RSS may comprise the outstanding average RSS identified at 308, and the second average RSS may comprise a next (e.g., having a nearest value to the first average RSS) average RSS. In this example, a difference between the first average RSS value and the second average RSS value can be compared with the RSS value difference threshold. For example, the RSS value difference threshold may comprise a signal strength range, within which, a proximate beacon may not be indicated (e.g., there is not enough RSS difference between two beacons to identify the actual proximate beacon).

In one embodiment, the desired RSS threshold may comprise an RSS value proportion difference between the first average RSS and the second average RSS. As one example, an RSS value difference of eight (e.g., dBmW) between the first RSS average and the second RSS average may comprise a higher proportion of first RSS average if the first RSS average value was negative thirty-two (e.g., twenty-five percent), than if the first RSS average value was negative eighty (e.g., ten percent).

In this embodiment, for example, the RSS value proportion difference threshold may comprise a proportion (e.g., a percentage, or some other representation of proportion) of the difference between the outstanding RSS average and the next RSS average to the outstanding RSS average (e.g., ten to one, 10%, etc.). In this example, a RSS value difference that does not meet the RSS value proportion difference threshold may indicate that a proximate beacon cannot be determined (e.g., there is not enough RSS difference, proportionally, between two beacons to identify the actual proximate beacon).

In another embodiment, a first function (e.g., a curve) of RSS difference threshold may be used in identifying the desired RSS difference threshold, such as by comparing the first average RSS (e.g., the outstanding RSS) to the function, for example. The function of RSS difference threshold may be plotted as a curve, for example, and the first average RSS may be compared against the curve to determine on which side of the curve the first average RSS lays. In this example, if the first average RSS is on a side of the curve that allows for identifying the RSS as within a desired range, and/or distinct from a second RSS, the corresponding beacon may be selected as the proximate beacon.

In another embodiment, a second function may represent a mapping of the outstanding RSS average to the desired RSS difference threshold. As one example, the second function may be applied to the outstanding RSS average (e.g., first RSS average). For example, a difference between the outstanding RSS average (e.g., first RSS average) and a next RSS average (e.g., second RSS average) can be compared with the second function to determine if the beacon associated with the outstanding RSS average (e.g., first RSS average) may be selected as the proximate beacon, such as where the difference between the outstanding RSS average and the next RSS average is greater than the desired RSS difference threshold, for example.

At 310, if the selected average RSS (e.g., the one detected RSS average of 304, or the "outstanding" RSS average of 308) does not meet the desired RSS threshold (e.g., the RSS value threshold value, the RSS value difference threshold, and/or the RSS value proportion difference threshold) (NO at 310) no proximate beacon may be identified, at 306. If the selected average RSS does meet the desired RSS threshold (YES at 310) the beacon associated with the selected average RSS may be selected as the proximate beacon, at 312.

In one embodiment, the beacon associated with the selected average RSS may be identified using a beacon identifier (ID). As described above, for example, a beacon ID may be associated with a corresponding beacon in a database. Additionally, in this example, the signal transmitted by the beacon associated with the selected average RSS may comprises an indication of the beacon ID (e.g., in the beacon data report). The beacon ID may be used to identify the associated beacon in the database, for example, thereby identifying the proximate beacon.

In one embodiment, at 354 in the example embodiment 300, a potential location of the mobile device may be determined, based at least upon the proximate beacon. As one example, as described above, the beacon ID may be associated with the beacon location in the database. For example, an installation location of the proximate beacon (e.g., in a shop) can be linked to the beacon ID for the proximate beacon in the database, and the beacon ID can be used to identify that installation location. Further, for example, the location of the proximate beacon may be used as a likely location of the mobile device/user (e.g., in the same shop).

A system may be devised for that can identify a probable location of a mobile device (e.g., within a known area) in proximity to a beacon device transmitting a locating signal. For example, a plurality of beacons may respectively transmit a wireless signal, detectable by a mobile device within range of the signal. Signals detected by the mobile device over an observation period can be analyzed to identify a beacon that may be "most" proximate to the mobile device, based on an average signal strength. Further, a non-stationary mobile device (e.g., a user of the device is moving), may be detected, and a proximate beacon may not be identified.

Figure 6:
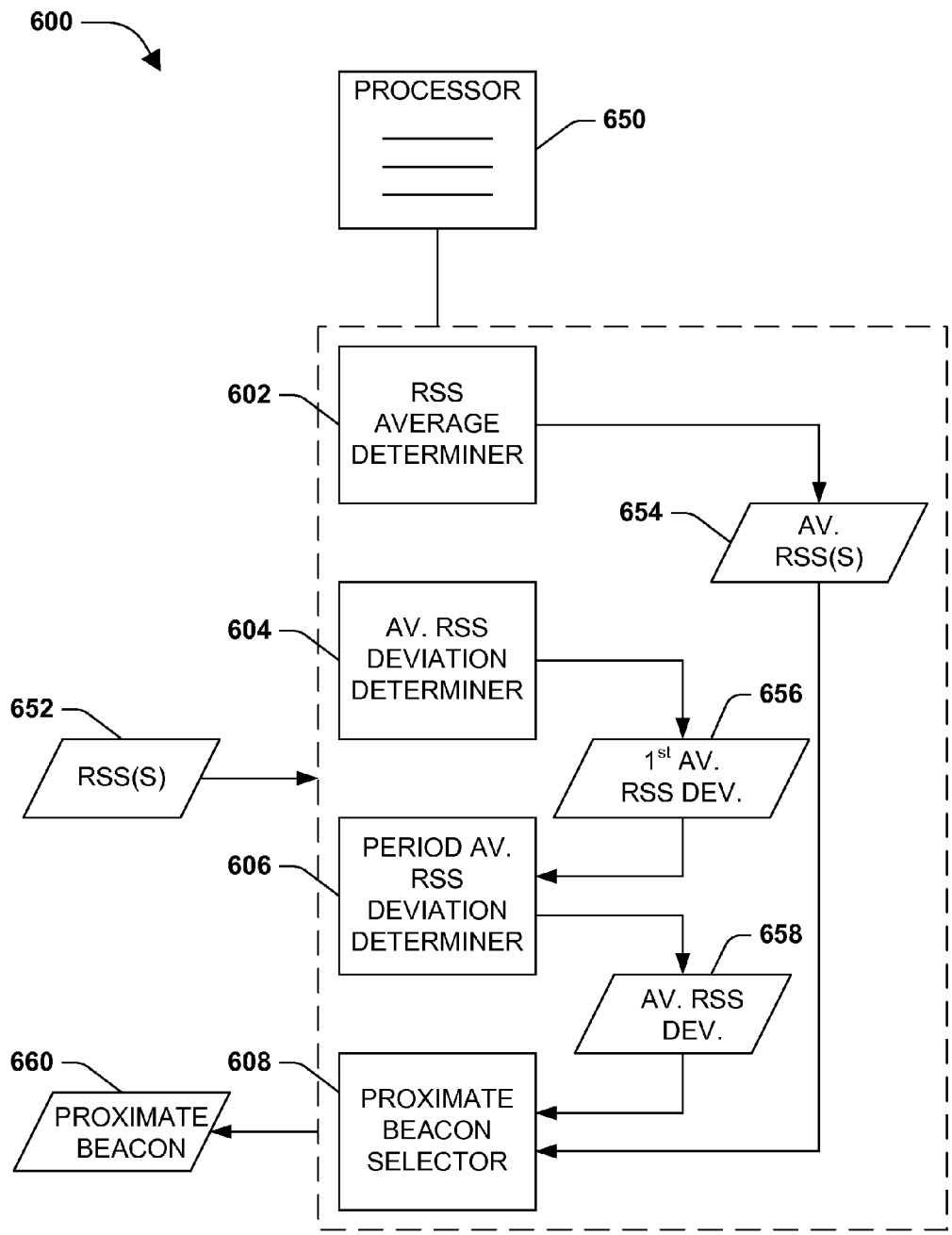
FIG. 6 is a component diagram illustrating an exemplary system for identifying a proximate beacon to a mobile device.

FIG. 6 is a component diagram illustrating an exemplary system 600 for identifying a proximate beacon to a mobile device. In the exemplary system 600, a received signal strength (RSS) average determination component 602 is configured to determine a first (e.g., second, third, etc.) average RSS 654. The determination of the first average RSS 654 is based at least on one or more first (e.g., second, third, etc.) RSSs 652 received for a first (e.g., second, third, etc.) beacon relative to a mobile device over a desired observation period. Further, an average RSS deviation determination component 604 is configured to determine a first (e.g., second, third, etc.) average RSS deviation 656, where the determination of the first average RSS deviation 656 is based at least on the one or more first RSSs 652 received for the first beacon over the desired observation period.

In the exemplary system 600, a period average RSS deviation determination component 606 is configured to determine an average RSS deviation 658 for the desired observation period based at least upon the first average RSS deviation 656 for the desired observation period. Additionally, if the first average RSS deviation 656 meets a desired deviation threshold, a proximate beacon selection component 608 is configured to identify a proximate beacon 660 based at least upon the first average RSS 654. In this exemplary system 600, at least some of the system is implemented, at least in part, via a processing unit 650.

Figure 7:
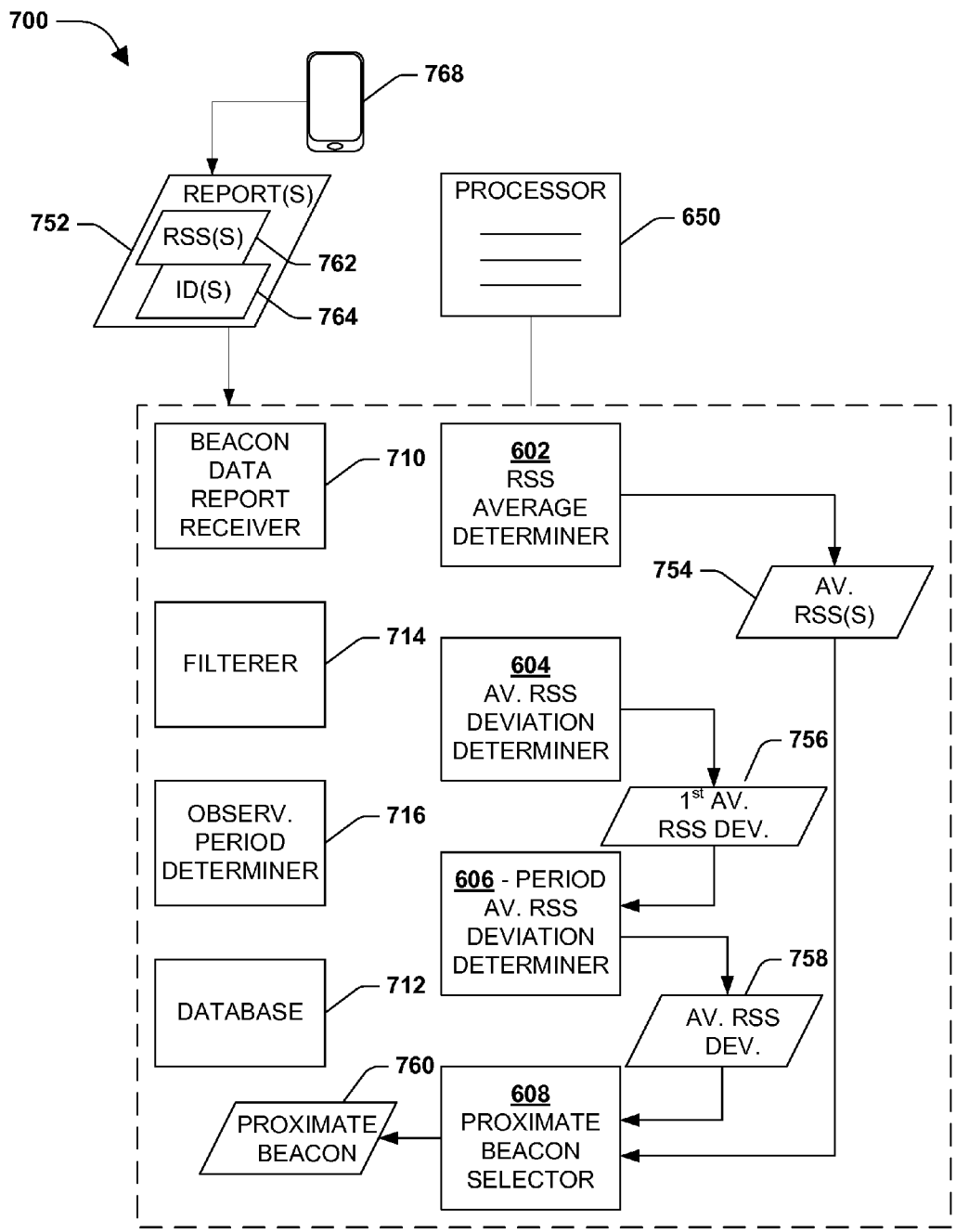
FIG. 7 is a component diagram illustrating an example embodiment where one or more systems described herein may be implemented.

FIG. 7 is a component diagram illustrating an example embodiment 700 where one or more systems described herein may be implemented. In this example 700, an extension of FIG. 6 is provided and thus description of elements, components, etc. described with respect to FIG. 6 may not be repeated for simplicity. In one embodiment, the proximate beacon selection component 608 may be configured to identify the first beacon as the proximate beacon 760 if the first average RSS 754 comprises a desired value when compared with a second average RSS value corresponding to a second beacon. That is, for example, the desired value may comprise a highest value, such that the first beacon has a higher average RSS than the second beacon.

In one embodiment, the proximate beacon selection component 608 may be configured to identify the first beacon as the proximate beacon 760 if merely the first average RSS 754 is received. That is, for example, if only one set of RSS data is received, corresponding to a single beacon, that beacon may be selected as the proximate beacon 760. In one embodiment, the proximate beacon selection component 608 may be configured to identify the first beacon as the proximate beacon 760 if the first average RSS 754 meets a desired RSS threshold. As one example, the desired RSS threshold may comprise a desired signal strength (e.g., corresponding to a limiting distance from the beacon); a RSS value difference between the first and a second RSS average (e.g., indicating that two different beacons may be within a similar range from the mobile device); and/or a RSS value proportion difference between the first and second average RSS.

In the example embodiment 700, a beacon data report receiving component 710 may be configured to receive a beacon data report 752 from a mobile device 768. The beacon data report can comprise a detected beacon RSS 762, corresponding to a detected beacon and/or a detected beacon identifier 764 corresponding to the detected beacon. A database component 712 can be configured to identify a detected beacon based at least upon the detected beacon identifier 764. As one example, the mobile device 768 may detect a signal transmitted from the first beacon. In this example, the first beacon's signal can comprise a first beacon identifier 764. Further, the mobile device 768 can detect a strength of the first beacon's signal, and prepare and send a report comprising the detected signal strength (RSS 762) of the first beacon, along with the first beacon identifier 764.

The example system 700 comprises an observation period determination component 716 that may be configured to determine a desired observation period used to identify appropriate data for identifying the proximate beacon. The desired observation period may comprise a period of time, during which, a desired number of beacon data reports 752 are received, such as by the beacon data report receiving component 710. For example, the desired observation period may be used to identify which received RSSs may be used to determine the one or more average RSSs, the first (e.g., second, third, etc.) average RSS deviation 756 and/or the average RSS deviation 758.

In the example embodiment 700, a filtering component 714 may be configured to filter out an outlier RSS. In one embodiment, the filtering component 714 may identify the outlier RSS in a received beacon data report 752, and filter out the outlier RSS from use in determining an average RSS for the beacon associated with the outlier RSS. For example, interference (e.g., electrical noise) from some building, mechanical, electrical and other components/devices may produce a false beacon signal, and/or a signal strength may vary over time due to temporary obstructions, variations in circuitry, etc., which may not be indicative of the actual beacon signal strength received by the mobile device. Signal noise and/or a false signal may result in a sharp increase or decrease in a RSS for a beacon, for example, which may be identified when compared with one or more prior or subsequent RSSs received for the beacon.

Figure 8:
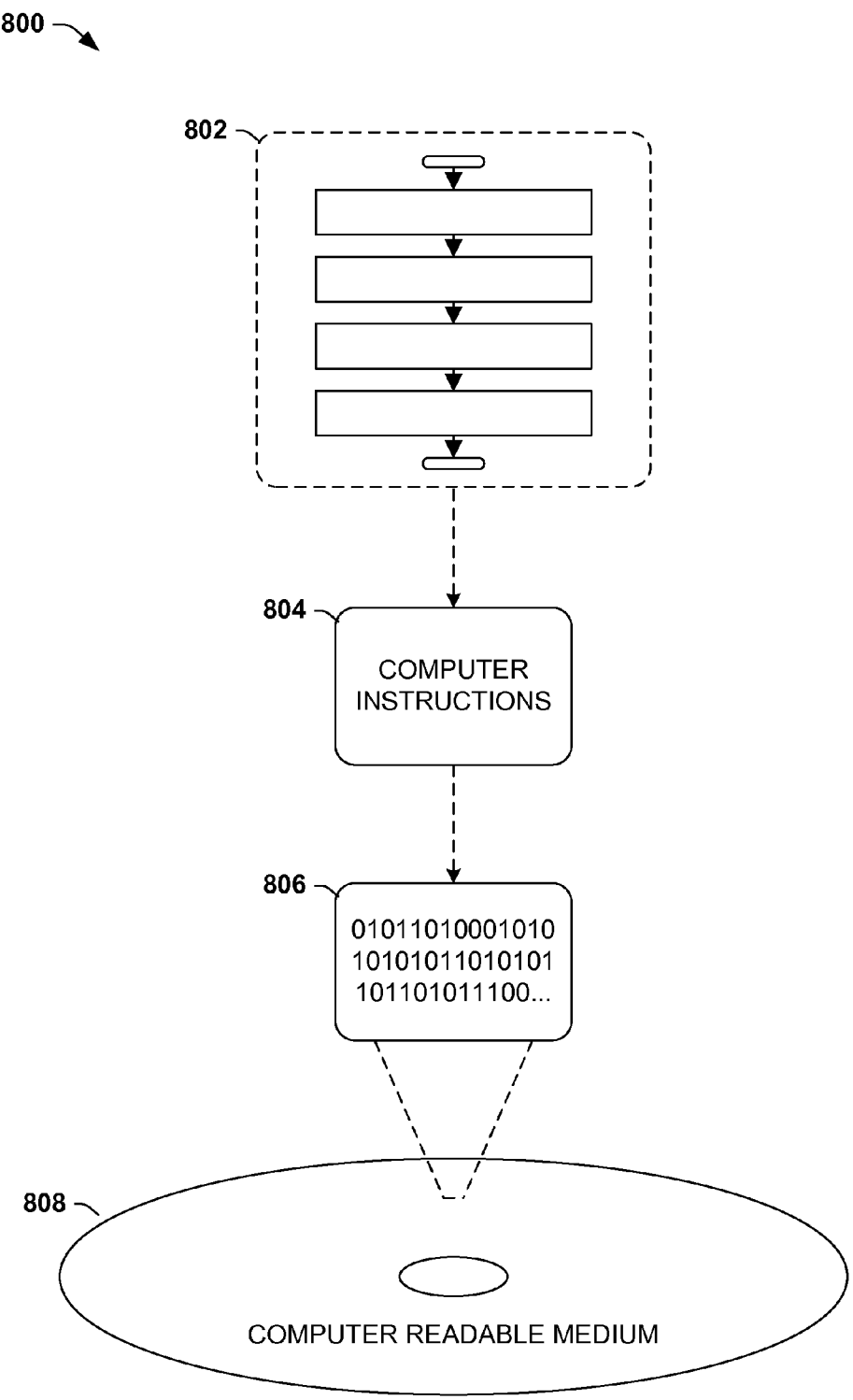
FIG. 8 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 808 (e.g., a CD-R, DVD-R or a platter of a hard disk drive), on which is encoded computer-readable data 806. This computer-readable data 806 in turn comprises a set of computer instructions 804 configured to operate according to one or more of the principles set forth herein. In one such embodiment 802, the processor-executable instructions 804 may be configured to perform a method, such as at least some of the exemplary method 100 of FIG. 1, for example. In another such embodiment, the processor-executable instructions 804 may be configured to implement a system, such as at least some of the exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

Figure 9:
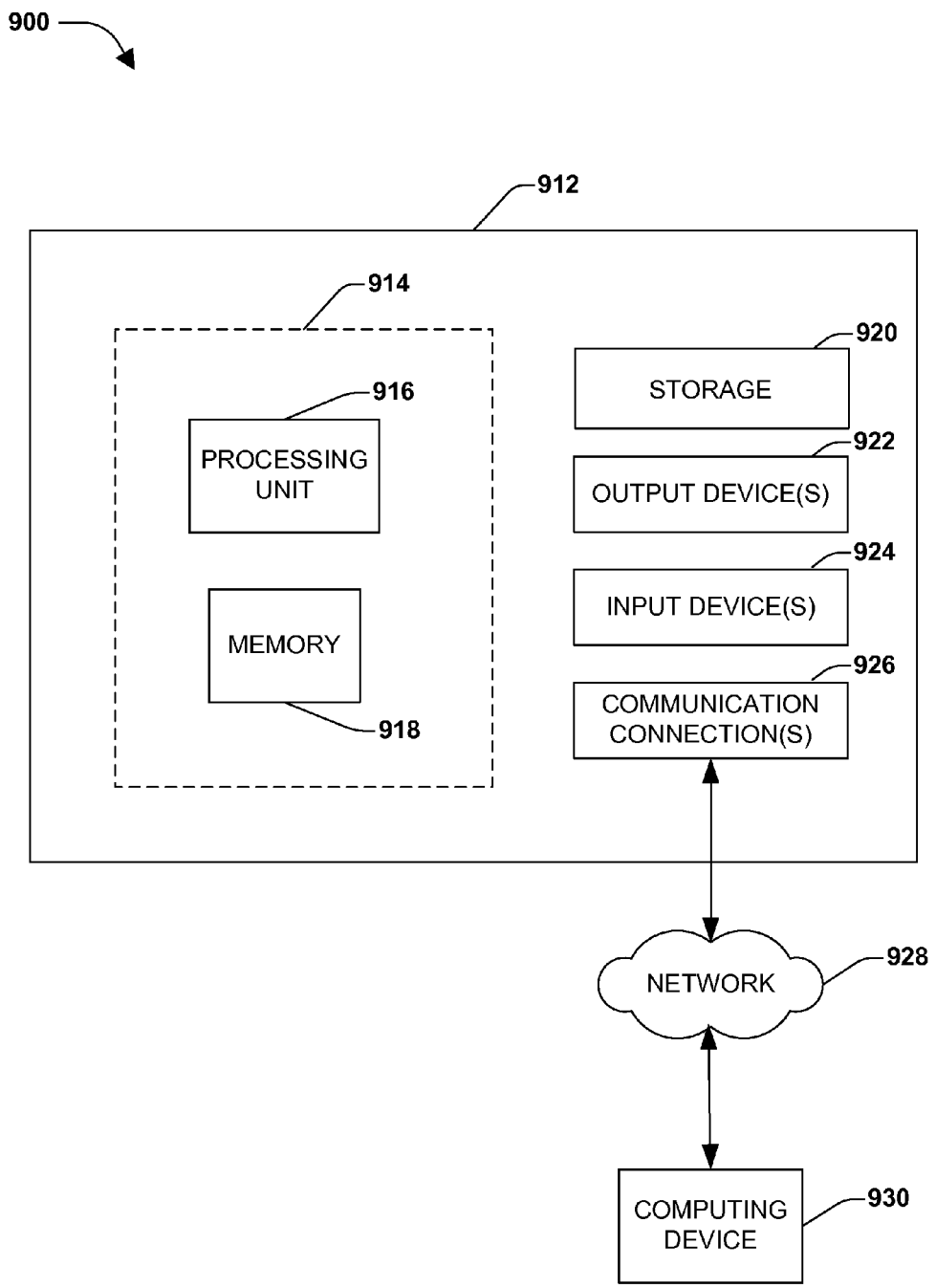
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method for identifying a proximate beacon to a mobile device, comprising:
    determining a first average received signal strength (RSS) and a first average RSS deviation for a first beacon, based at least upon a first RSS relative to a mobile device over a desired observation period;
    determining an average RSS deviation for the desired observation period based at least upon the first average RSS deviation; and
    identifying the first beacon as a proximate beacon based at least upon the first average RSS, if the average RSS deviation meets a desired deviation threshold, at least a portion of the method implemented at least in part via a processing unit.

2. The method of claim 1, comprising receiving a first beacon data report comprising one or more of:
    the first RSS;
    a first transmission power for the first beacon; or
    a first beacon identifier corresponding to the first beacon.

3. The method of claim 2, comprising identifying the first beacon using the first beacon identifier.

4. The method of claim 2, comprising receiving the first beacon data report from the mobile device.

5. The method of claim 1, comprising identifying the desired observation period, the desired observation period comprising a period of time during which a desired number of beacon data reports are received.

6. The method of claim 1, comprising identifying a potential location of the mobile device based at least upon the proximate beacon.

7. The method of claim 1, comprising determining that the first beacon does not comprise a proximate beacon if the average RSS deviation does not meet the desired deviation threshold.

8. The method of claim 1, comprising receiving a desired number of first beacon data reports for the first beacon, over the desired observation period, prior to determining the first average RSS.

9. The method of claim 1, comprising one or more of:
    identifying an outlier RSS; or
    not using the outlier RSS in determining the first average RSS.

10. The method of claim 1, comprising:
    determining a second average RSS and a second average RSS deviation for a second beacon, based at least upon a second RSS relative to the mobile device over the desired observation period;
    determining the average RSS deviation for the desired observation period based at least upon the first average RSS deviation and the second average RSS deviation; and
    identifying the second beacon, and not the first beacon, as the proximate beacon if the second average RSS is greater than the first average RSS, the second average RSS meets a desired RSS threshold, and the average RSS deviation, based at least upon the first average RSS deviation and the second average RSS deviation, meets the desired deviation threshold.

11. The method of claim 1, comprising identifying the first beacon as the proximate beacon if the first average RSS meets a desired RSS threshold.

12. The method of claim 11, comprising identifying the desired RSS threshold, the desired RSS threshold comprising one or more of:
    an RSS value;
    an RSS value difference between the first average RSS and a second average RSS for a second beacon;
    an RSS value proportion difference between the first average RSS and the second average RSS for the second beacon; or
    a function of RSS difference compared against the first average RSS.

13. A system for identifying a proximate beacon to a mobile device, comprising:
    a received signal strength (RSS) average determination component configured to determine a first average RSS for a first beacon, based at least upon a first RSS relative to a mobile device over a desired observation period;
    an average RSS deviation determination component configured to determine a first average RSS deviation for the first beacon, based at least upon the first RSS;
    a period average RSS deviation determination component configured to determine an average RSS deviation for the desired observation period based at least upon the first average RSS deviation; and
    a proximate beacon selection component configured to identify the first beacon as a proximate beacon based at least upon the first average RSS, if the average RSS deviation meets a desired deviation threshold, at least some of the system implemented at least in part via a processing unit.

14. The system of claim 13, the proximate beacon selection component configured to identify the first beacon as the proximate beacon if one or more of:
    the first average RSS comprises a desired value when compared with a second average RSS value corresponding to a second beacon;
    merely the first average RSS is received; or
    the first average RSS meets a desired RSS threshold.

15. The system of claim 13, comprising a beacon data report receiving component configured to receive a beacon data report from the mobile device.

16. The system of claim 15, the beacon data report comprising one or more of:
    a detected beacon RSS; or
    a detected beacon identifier corresponding to a detected beacon.

17. The system of claim 16, comprising a database component configured to identify the detected beacon based at least upon the detected beacon identifier.

18. The system of claim 13, comprising an observation period determination component configured to determine the desired observation period, the desired observation period comprising a period of time during which a desired number of beacon data reports are received.

19. The system of claim 13, comprising a filtering component configured to filter out an outlier RSS.

20. A computer readable medium, excluding signals, comprising instructions that when executed via a processing unit perform a method for identifying a proximate beacon to a mobile device, comprising:
    determining a first average received signal strength (RSS) and a first average RSS deviation for a first beacon, based at least upon a first RSS relative to a mobile device over a desired observation period;
    determining an average RSS deviation for the desired observation period based at least upon the first average RSS deviation; and identifying the first beacon as a proximate beacon based at least upon the first average RSS, if the average RSS deviation meets a desired deviation threshold.

\* \* \* \* \*